United States Patent
Davies et al.

(10) Patent No.: US 8,263,277 B2
(45) Date of Patent: Sep. 11, 2012

(54) REHYDRATION OF FUEL CELLS

(75) Inventors: Damian Davies, Newark (GB); Nathan Grange, Kegworth (GB); Paul Alan Benson, Loughborough (GB)

(73) Assignee: Intelligent Energy Limited, Beckenham, Kent (GB)

( * ) Notice: Subject to any disclaimer, the term of this patent is extended or adjusted under 35 U.S.C. 154(b) by 758 days.

(21) Appl. No.: 12/224,695

(22) PCT Filed: Mar. 5, 2007

(86) PCT No.: PCT/GB2007/000760
§ 371 (c)(1),
(2), (4) Date: Jan. 28, 2009

(87) PCT Pub. No.: WO2007/099360
PCT Pub. Date: Sep. 7, 2007

(65) Prior Publication Data
US 2009/0297894 A1 Dec. 3, 2009

(30) Foreign Application Priority Data
Mar. 3, 2006 (GB) .................................. 0604241.0

(51) Int. Cl.
H01M 8/04 (2006.01)
(52) U.S. Cl. .................................................... 429/431
(58) Field of Classification Search .................. 429/431, 429/432, 506
See application file for complete search history.

(56) References Cited

U.S. PATENT DOCUMENTS

| | | | |
|---|---|---|---|
| 3,432,356 A | 3/1969 | Christianson | |
| 7,270,900 B2 * | 9/2007 | Lecky | 429/431 |
| 7,754,361 B2 * | 7/2010 | Kelley et al. | 307/150 |
| 2001/0049038 A1 * | 12/2001 | Dickman et al. | 429/19 |
| 2004/0023083 A1 | 2/2004 | Yang et al. | |
| 2004/0166387 A1 | 8/2004 | Imamura et al. | |
| 2008/0299420 A1 * | 12/2008 | Kelley et al. | 429/13 |

FOREIGN PATENT DOCUMENTS

| | | |
|---|---|---|
| GB | 2412784 | 10/2005 |
| WO | WO 01/28022 | 4/2001 |
| WO | WO 2005/024987 | 3/2005 |
| WO | WO 2006/028259 | 3/2006 |

OTHER PUBLICATIONS

International Search Report dated Dec. 27, 2007.
First Office Action for Japanese Application No. 200780007676.1, dated Feb. 5, 2010.
European Office Action for European Application No. 07 731 980. 4-2119, dated Aug. 13, 2009.

(Continued)

Primary Examiner — Phuong Dinh
(74) Attorney, Agent, or Firm — Ohlandt, Greeley, Ruggiero & Perle, LLP

(57) ABSTRACT

One or more operating parameters, such as electrical current flow from and air flow to, a fuel cell stack within a fuel cell assembly is periodically modulated during rehydration intervals to intermittently increase hydration levels of the fuel cell stack independently of the electrical current demand on the fuel cell assembly from an external load, while maintaining electrical current delivery to that external load.

14 Claims, 5 Drawing Sheets

OTHER PUBLICATIONS

International Preliminary Report on Patentability for PCT application No. PCT/GB2007/000760. Preliminary Amendment dated Nov. 20, 2008 for European application No. 07731980.4-2119.
Divisional Application dated for Nov. 16, 2009 for European application No. 09014297-1227.

European Search Report dated Jan. 27, 2010 for European application No. 09014297-1227.
Decision of Grant dated Mar. 22, 2012 for European application No. 09014297-1227.
Decision of Grant dated Oct. 7, 2010 for European application No. 07731980.4.

* cited by examiner

REHYDRATION OF FUEL CELLS

The present invention relates to fuel cells and in particular to proton-exchange membrane type fuel cells in which hydrogen is supplied to the anode side of the fuel cell, oxygen is supplied to the cathode side of the fuel cell and water by-product is produced at and removed from the cathode side of the fuel cell.

Such fuel cells comprise a proton exchange membrane (PEM) sandwiched between two porous electrodes, together comprising a membrane-electrode assembly (MEA). The MEA itself is conventionally sandwiched between: (i) a cathode diffusion structure having a first face adjacent to the cathode face of the MEA and (ii) an anode diffusion structure having a first face adjacent the anode face of the MEA. The second face of the anode diffusion structure contacts an anode fluid flow field plate for current collection and for distributing hydrogen to the second face of the anode diffusion structure. The second face of the cathode diffusion structure contacts a cathode fluid flow field plate for current collection, for distributing oxygen to the second face of the cathode diffusion structure, and for extracting excess water from the MEA. The anode and cathode fluid flow field plates conventionally each comprise a rigid, electrically conductive material having fluid flow channels in the surface adjacent the respective diffusion structure for delivery of the reactant gases (e.g. hydrogen and oxygen) and removal of the exhaust gases (e.g. unused oxygen and water vapour).

An important consideration in the operation of such fuel cells is the management of water within the MEA. During operation of a PEM fuel cell, product water from the reaction between hydrogen and oxygen is formed at catalytic sites of the MEA. This water must be exhausted from the MEA via the cathode diffusion structure at the same time that oxygen is transported to the cathode face of the MEA. However, it is also important that the MEA remains suitably hydrated to ensure that the internal electrical resistance of the cell remains within tolerable limits. Failure to control the MEA humidification leads to hot spots and potential cell failure and/or poor electrical cell performance.

A key function during the fuel cell electrochemical reaction between hydrogen and oxygen is the proton migration process via the PEM. The proton exchange process will only occur when the solid state PEM is sufficiently hydrated. With insufficient water present, the water drag characteristics of the membrane will restrict the proton migration process leading to an increase in the internal resistance of the cell. With over-saturation of the PEM there is the possibility that excess water will 'flood' the electrode part of the MEA and restrict gas access to the so called three phase reaction interface. Both these events have a negative effect on the overall performance of the fuel cell.

Although water is produced at the cathode as part of the fuel cell reaction, it is essential to maintain a water balance across the whole MEA. Where dry air is introduced into the cell there is a tendency for the creation of an unbalanced water distribution across the membrane such that the area around the inlet port is drier than elsewhere. Ultimately this could mechanically stress the membrane and lead to uneven current distribution, both of which can lead to premature failure. To counter this, existing practice is to pre-humidify the air stream prior to its delivery to the active part of the fuel cell. This adds to system complexity and can often be impractical for some fuel cell applications.

In open cathode fuel cells, the cathode fluid flow field plates are open to ambient air, usually assisted by a low pressure air source such as a fan, which provides the dual function of stack cooling and oxygen supply. This allows a very simple fuel cell system to be designed avoiding the large parasitic losses (i.e. the electrical power drain of the fuel cell support systems) that would normally be associated with a fuel cell stack utilising a pressurised cathode and a humidification sub-system. However, the dual purpose of the air flow (for both oxygen delivery and air cooling) may lead to a conflict in air flow requirements. A very high stoichiometric air flow across the cathode electrodes is required for cooling and, depending on ambient conditions and stack temperature this may result in a low membrane water content (resulting in low performance) or in extreme cases a continual net water loss from the fuel cell stack over time which will eventually result in the stack ceasing to function. This is because for a set level of stack power output (current density) a balance will be achieved between the water content of the fuel cell polymer membranes and the rate of water removal by the flow of air. A lower current, high air flow and warmer stack will tend to reduce the membrane water content and conversely a higher current, lower air flow and cooler stack will increase the membrane water content.

It is an object of the present invention to provide an improved fuel cell design and control strategy for overcoming or at least mitigating at least some of the above disadvantages.

According to one aspect, the present invention provides an electrochemical fuel cell assembly comprising:

a fuel cell stack comprising a number of fuel cells each having a membrane-electrode assembly and fluid flow plates for delivery of fuel and oxidant thereto, and an electrical output for delivery of current from the stack; and a stack power controller for periodically and temporarily increasing the current drawn from the fuel cell stack, in addition to or instead of independent current demand external to the fuel cell assembly, during rehydration intervals to increase the hydration level of the fuel cells.

According to another aspect, the present invention provides an electrochemical fuel cell assembly comprising:

a fuel cell stack comprising a number of fuel cells each having a membrane-electrode assembly and fluid flow plates for delivery of fuel and oxidant thereto, and an electrical output for delivery of current from the stack;

a stack controller for modulating air flow through the fuel cell stack on a periodic basis independent of current demand on the fuel cell stack assembly to provide rehydration intervals that increase the hydration level of the fuel cells; and means for maintaining the current demand to a load external to the fuel cell assembly during the rehydration intervals.

According to another aspect, the present invention provides a method of operating an electrochemical fuel cell assembly having a fuel cell stack comprising a number of fuel cells each having a membrane-electrode assembly and fluid flow plates for delivery of fuel and oxidant thereto, and an electrical output for delivery of current from the stack, the method comprising the steps of:

periodically and temporarily increasing the current drawn from the fuel cell stack independent of current demand external to the fuel cell assembly during rehydration intervals to increase the hydration level of the fuel cells; and maintaining the current demand to a load external to the fuel cell assembly during the rehydration intervals.

According to another aspect, the present invention provides a method of operating an electrochemical fuel cell assembly having a fuel cell stack comprising a number of fuel cells each having a membrane-electrode assembly and fluid flow plates for delivery of fuel and oxidant thereto, and an electrical output for delivery of current from the stack, the method comprising the steps of:

modulating air flow through the fuel cell stack on a periodic basis independent of current demand on the fuel cell stack assembly to provide rehydration intervals that increase the hydration level of the fuel cells while maintaining the current demand to a load external to the fuel cell assembly during the rehydration intervals.

In a general aspect, the invention provides a fuel cell assembly in which one or more operating parameters, such as electrical current flow from, and air flow to, a fuel cell stack within the assembly is periodically modulated during rehydration intervals to intermittently increase hydration levels of the fuel cell stack independently of an electrical current demand on the fuel cell assembly from an external load to the fuel cell assembly. During the rehydration interval, the electrical current delivery to the external load is maintained.

Embodiments of the present invention will now be described by way of example and with reference to the accompanying drawings in which.

The invention proposes temporarily disrupting the equilibrium (as would be determined by existing operating conditions of a fuel cell stack) of membrane water content and rate of water removal to achieve a higher stack and system efficiency. The procedure involves producing excess water at the fuel cell cathode for short periods of time and subsequently operating the stack with a higher performance while the equilibrium with a lower water content is gradually re-established. The process can be repeated at certain interval frequencies as required.

The short periods of time during which excess water is produced are referred to in this specification as 'rehydration intervals' which expression is intended to indicate a period of time in which the fuel cell assembly actively controls its operating environment to purposively increase hydration levels above a level that would otherwise prevail based on the external electrical load on the fuel cell and its environmental operating conditions such as temperature. This rehydration process can be achieved by one or both of the following techniques:

a) Operation of the fuel cell at a higher power output than the 'normal' operating conditions as determined by the externally applied load on the fuel cell assembly, hence producing excess water via the electrochemical reaction, and b) Modulation or brief stoppage of the amount (flow rate) of air through the fuel cell to minimise the water removal process.

The main benefit of this procedure is an improved performance during the normal operating conditions due to a higher cell voltage, giving improved energy conversion efficiency. This results in a lower stack operating temperature that can extend the life expectancy of the membrane. The beneficial effects of the rehydration procedure described here is most evident during start-up of a fuel cell assembly. This is particularly the case for conditioning a newly-built fuel cell where the rehydration process can improve the response of an unconditioned fuel cell stack to immediate large load demands.

A secondary, benefit is allowing air-cooled (open cathode) fuel cell stacks to operate in a wider, range of environments, especially hotter and drier ambient conditions. In a fuel cell system utilising an open cathode stack, conventionally the only way to adjust the fuel cell membrane water content is to change the air flow delivered by the cooling fan, where an increase in ah flow will result in a lower stack temperature and conversely a lower ah flow will heat the stack. However, depending on ambient air humidity, either of these actions can actually result in further water loss from the stack. The invention proposes integrating a fuel cell stack into a system with hardware and an operational controller to provide for rehydration not directly dependent on operating ambient and external load conditions so as to maintain a more optimum performance.

Figure 1:
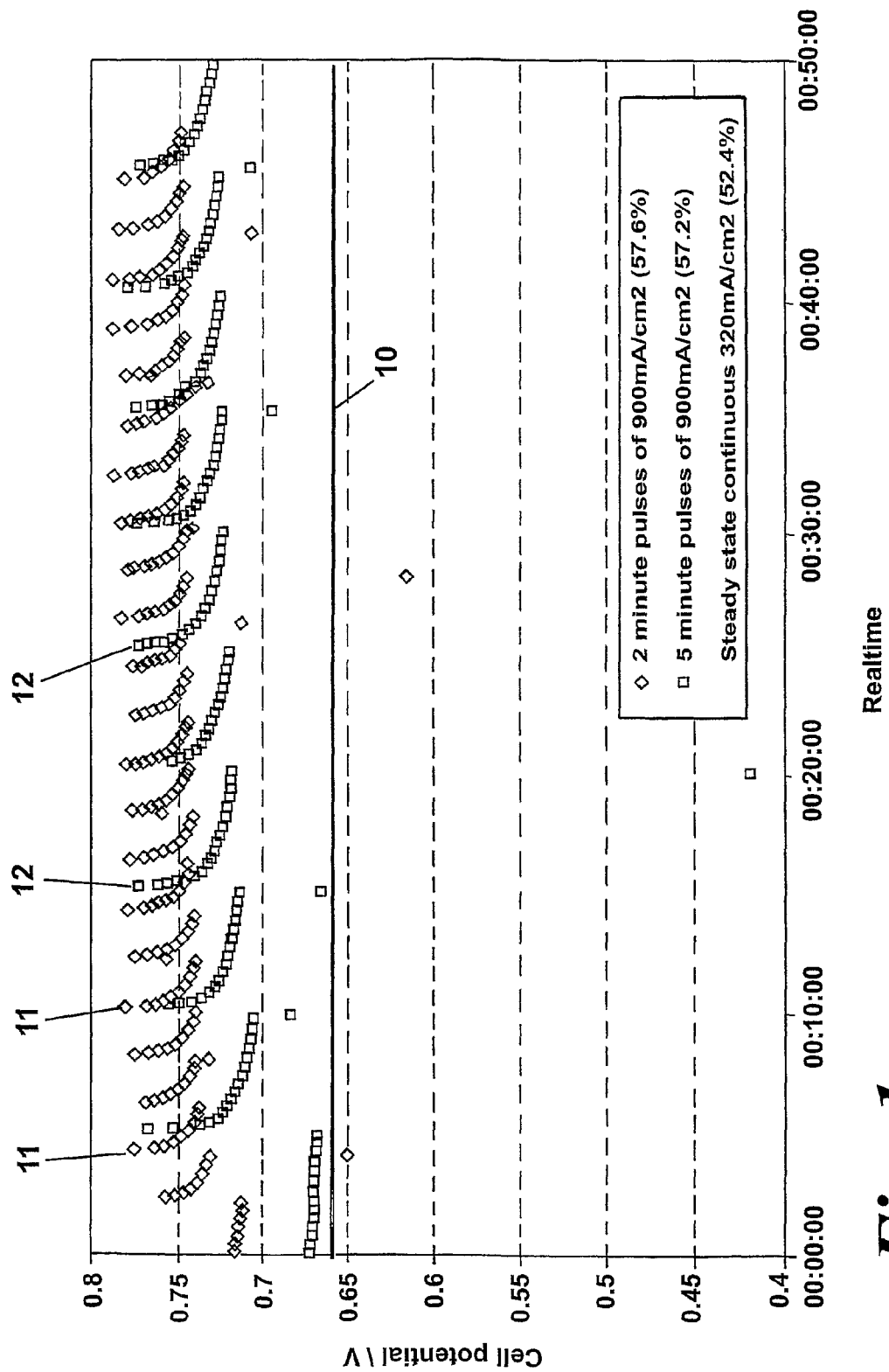
FIG. 1 is a graph showing cell potential as a function of time for conventional steady state operation of a fuel cell compared with pulsed current operation of the fuel cell for two different pulse repetition intervals.

The effect of periodically and temporarily increasing the current drawn from a fuel cells above its base load to a higher current is shown in FIG. 1. Here, the stack was operating at a base load of 320 mA/cm$^2$. The base load may be considered as that which is determined by the external current demand on the fuel cell assembly, together with any continuous parasitic load on the fuel cell stack by the fuel cell assembly itself (i.e. control circuits, fans, etc). The periodic and temporary increased current demand on the fuel cell stack occurred as current pulses in which the stack current was increased to 900 mA/cm$^2$ for a rehydration interval of approximately 5 seconds at two and five minute intervals respectively. The overall improvement in efficiency was based on the lower heating value (LHV) of $H_2$ at 50 degrees C. and assumes zero efficiency during the 5 second rehydration pulse at high load.

A steady state base load of 320 mA/cm$^2$ results in a cell voltage of just over 0.65 V as shown by line 10 in FIG. 1 and an LHV of 52.4%. The cell voltage when operated with rehydration intervals of 5 seconds duration every 2 minutes is given by line 11 in FIG. 1. This corresponds to a rehydration duty cycle of about 4.2% and gives an LHV of 57.6%. The cell voltage when operated with rehydration intervals of 5 seconds duration every 5 minutes is given by line 12 in FIG. 1. This corresponds to a rehydration duty cycle of about 1.7% and gives an LHV of 57.2%.

Figure 5:
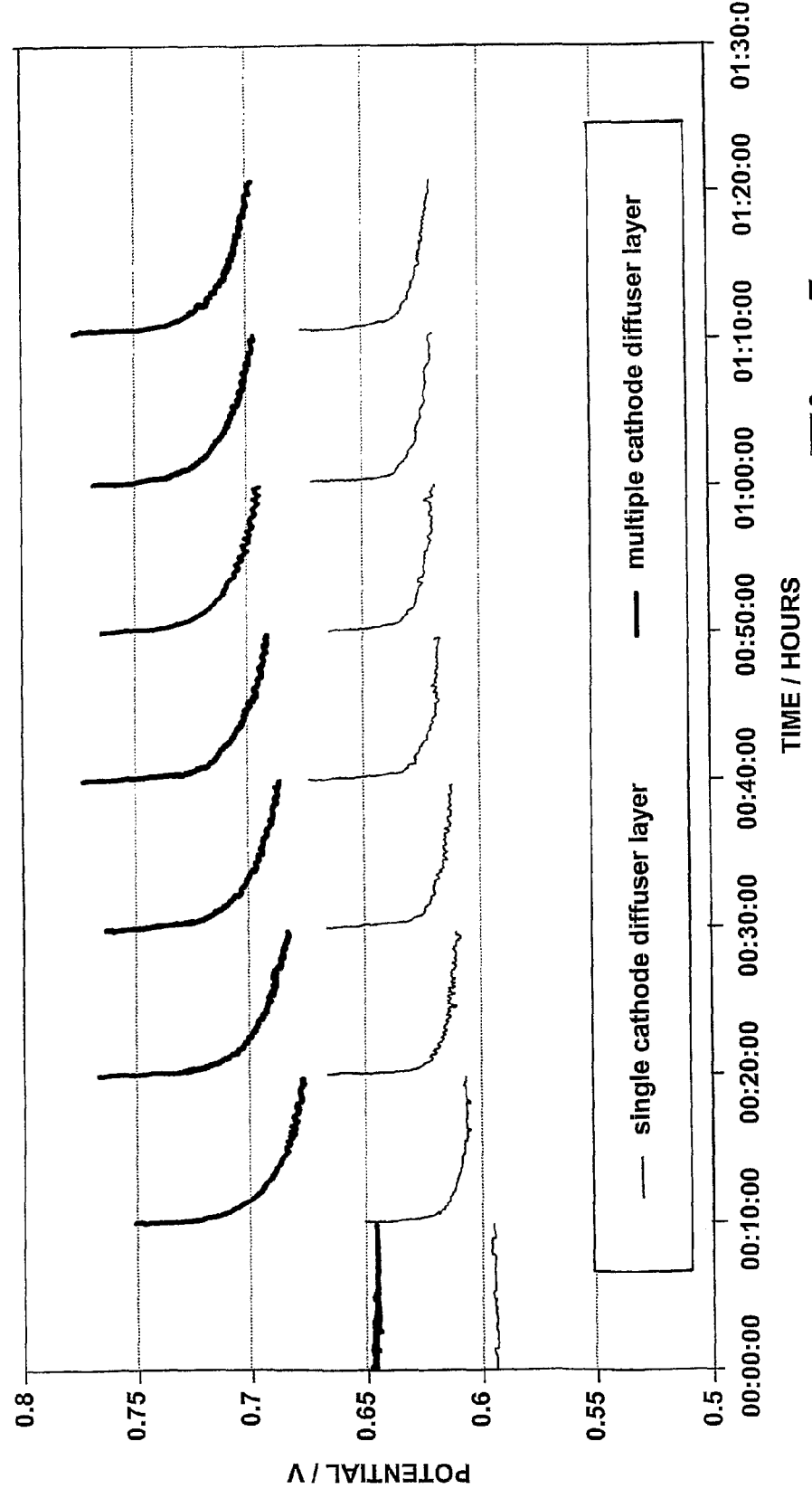
FIG. 5 is a graph showing the comparative improvement in fuel cell performance for the pulsed current operation in (i) a fuel cell with single layer cathode diffuser, and (ii) a fuel cell with multi-layer cathode diffuser.

The scale of the immediate increase in cell voltage after the rehydration intervals and the following decay is clear in FIG. 1. The improvement in performance will depend on the water retention factors of the fuel cell, in particular the characteristics of the polymer membrane and any gas diffusion layers incorporated therewith as well as the temperature and air flow through the cell stack. The hydration intervals are especially effective when used in conjunction with advanced diffusion media adjacent to the MEA which assist in control and retention of water levels at the membrane. The invention is therefore particularly advantageous when used in conjunction with multi-layer diffusion structures that assist in water trapping, such as the arrangement for open cathode stacks described in UK patent application 0501598.7 and the corresponding international patent application PCT/GB2006/000074. FIG. 5 shows a comparison between the improvements in fuel cell performance observed for the pulsed current operation in (i) a fuel cell with a single layer cathode diffuser, and (ii) a fuel cell with a multi-layer cathode diffuser. The upper trace shows the cell voltage for configuration (ii) and the lower trace shows the cell voltage for configuration (i). The rehydration pulses occur every ten minutes.

Figure 2:
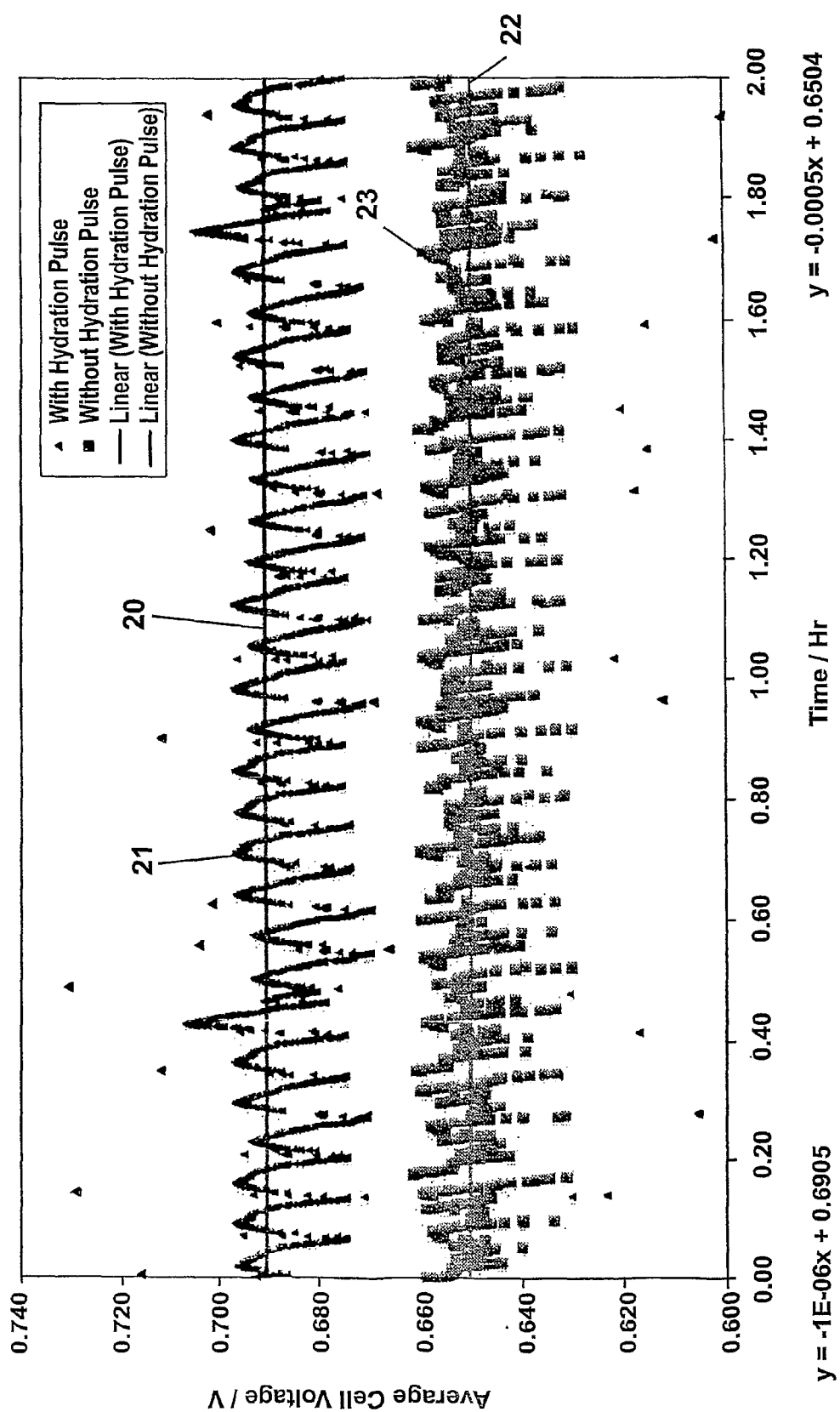
FIG. 2 is a graph showing instantaneous and averaged cell potential as a function of time for conventional steady state operation of a fuel cell compared with pulsed current operation.

FIG. 2 illustrates the effect on real time and averaged cell voltage of a fuel cell with and without rehydration current pulses. The cell voltage axis represents the average cell voltage across an entire stack, i.e. the stack voltage divided by the number of cells in the stack. The upper straight line 20 shows the time-averaged, cell voltage of just over 0.69 V, and the upper trace 21 shows the instantaneous cell voltage, both when the stack is operated with rehydration intervals. The lower straight line 22 shows the time-averaged cell voltage of just over 0.65 V, and the lower trace 23 shows the instantaneous cell voltage, both when the stack is operated without rehydration intervals. It should be noted that the lower trace 23 exhibits some periodicity at a different frequency than that of the upper trace 21 because there is, in both cases, a periodic anode purge to clear water build up on an otherwise closed-ended anode configuration, and this dominates the lower trace 23. Periodically, the closed-ended anode is switched to open-ended configuration to purge water from the anode for about 1 second. However, the effects of the rehydration intervals are very clear from the significant increase in average and instantaneous voltages 20, 21 over the equivalent voltages 22, 23 without rehydration intervals.

Figure 3:
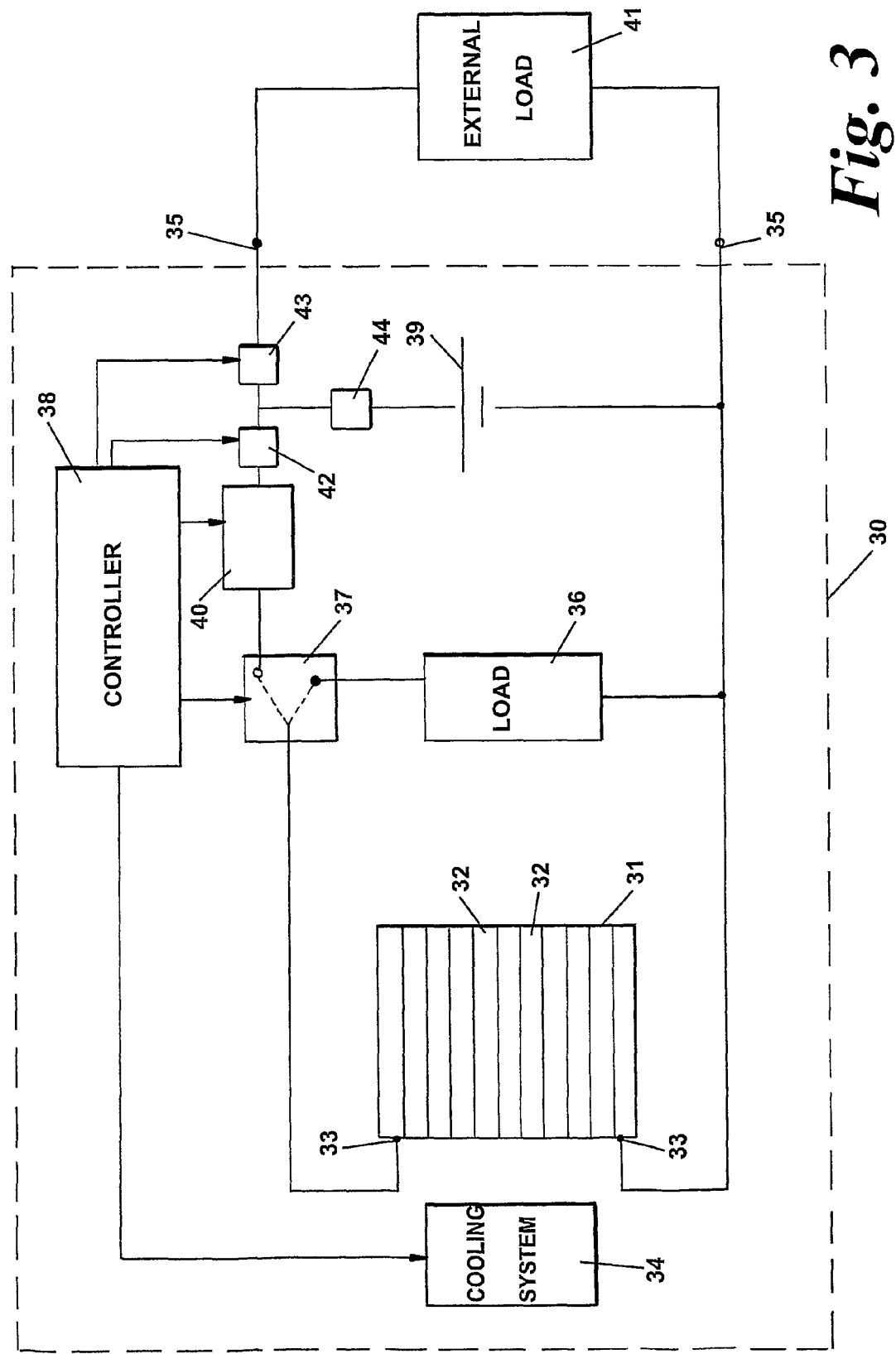
FIG. 3 is a schematic diagram of an electrochemical fuel cell power unit for implementing a pulsed current operation scheme.

To use the effect of rehydration intervals on a fuel cell system requires an additional control system as described in connection with FIG. 3.

An electrochemical fuel cell assembly 30 comprises a fuel cell stack 31 having a number of fuel cells 32 connected in series. Each fuel cell 32 includes a membrane-electrode assembly and fluid flow plates for delivery of fuel and oxidant thereto, in accordance with conventional fuel cell stack design. An electrical output 33 provides for delivery of electrical current from the stack 31. A cooling system 34, such as a fan, provides both cooling air flow and oxygen to the flow plates. Power from the fuel cell assembly 30 is delivered to an external load 41 by external power output terminals 35 via relays 42 and 43.

An internal electrical load 36 is switchable, by switch 37 under the control of a power controller 38, to periodically and temporarily increase the current drawn from the fuel cell stack 31. An auxiliary or 'reservoir' power source 39 is connected to the output terminals 35, through relay 43, to supply power to the power output terminals 35 at times when the fuel cell stack 31 is switched to supply the internal load 36. The load control circuit 40 and cooling system 34 may also be under the control of the power controller 38. The reservoir power source 39 is preferably a rechargeable battery but any other form of suitable charge storage device may be used, such as supercapacitors. The load control circuit 40 is preferably a DC/DC converter.

In use, the fuel cell stack 31 is normally switched to supply the external load 41, and the internal load 36 and reservoir power source 39 are both electrically isolated from the fuel cell stack 31 and the power output terminals 35.

However, during rehydration intervals, the power controller 38 opens relay 42 and operates switch 37 so that the reservoir power source 39 is isolated from the fuel cell stack 31 and current from fuel cell stack 31 is diverted to the internal load 36. To avoid interruption of power to the external load 41, at the same time, the power controller 38 maintains relay 43 in a closed condition to maintain electrical continuity between the reservoir power source 39 and the power output terminals 35 thereby supplying the external load 41. At the end of a rehydration interval, the controller 38 operates switch 37 and relay 42 to isolate the internal load 36 from the fuel cell stack 31 and to reconnect the fuel cell stack to the output terminals 41. At this time, the reservoir power source 39 preferably remains connected so that it can be recharged by current from the fuel cell stack 31. After a suitable charging period, the load control circuit 40 may operate to isolate the reservoir power source 39 using a third relay 44. Alternatively, the reservoir power source 39 could simply remain connected at all times.

Thus, it will be understood that the fuel cell-stack 31 is the main power source but during the rehydration interval, the battery 39 is the sole provider of power to the external load 41. When the fuel cell stack 31 comes back on line, it is able to fully recharge the battery 39 and as the battery approaches full state of charge the current into it will diminish.

Various modifications may be made to this arrangement. For example, the switch 37 need not be of the double throw variety if it is not necessary to isolate the fuel cell stack 31 and internal load 36 from the external load 41 during the rehydration interval. In other words, providing that the required power can still be delivered to the external load 41 during a rehydration interval, then in principle the internal load 36 can simply be added to the external load 41 in parallel during the rehydration interval. In this case, a reservoir power source 39 might not be strictly necessary since current is maintained from the fuel cell stack 31 to the external load 41 even during the rehydration interval. Similarly, the power output terminals 35 could be directly connected to the fuel cell stack 31; the internal load 36 switched in and out in a first parallel circuit as required; and the reservoir power source switched in and out with charge control in a second parallel circuit, as required.

Thus, in a general aspect, it will be recognised that the stack power controller 38 may use the internal load 36 for periodically and temporarily increasing the current drawn from the fuel cell stack in addition to or instead of independent current demand external to the fuel cell assembly during the rehydration intervals. If necessary, a power control device could be used to switch in the internal load 36 on a controlled basis to avoid large switching transients.

Rehydration intervals may also be implemented using a periodic and temporary reduction in air flow to the cathodes of the fuel cell stack 31. Thus, the power controller 38 may be configured to reduce power to the cooling fan 34 during a rehydration interval. Preferably, the cooling fan is switched off during the rehydration interval.

Thus, in a general aspect, the stack power controller 38 may modulate air flow through the fuel cell stack 31 on a periodic basis independent of electrical current demand on the fuel cell stack to provide rehydration intervals that increase the hydration level of the fuel cells. The expression 'independent' in this context is intended to indicate independence from immediate or transient changes in the external electrical load 41 on the fuel cell assembly 30.

Figure 4:
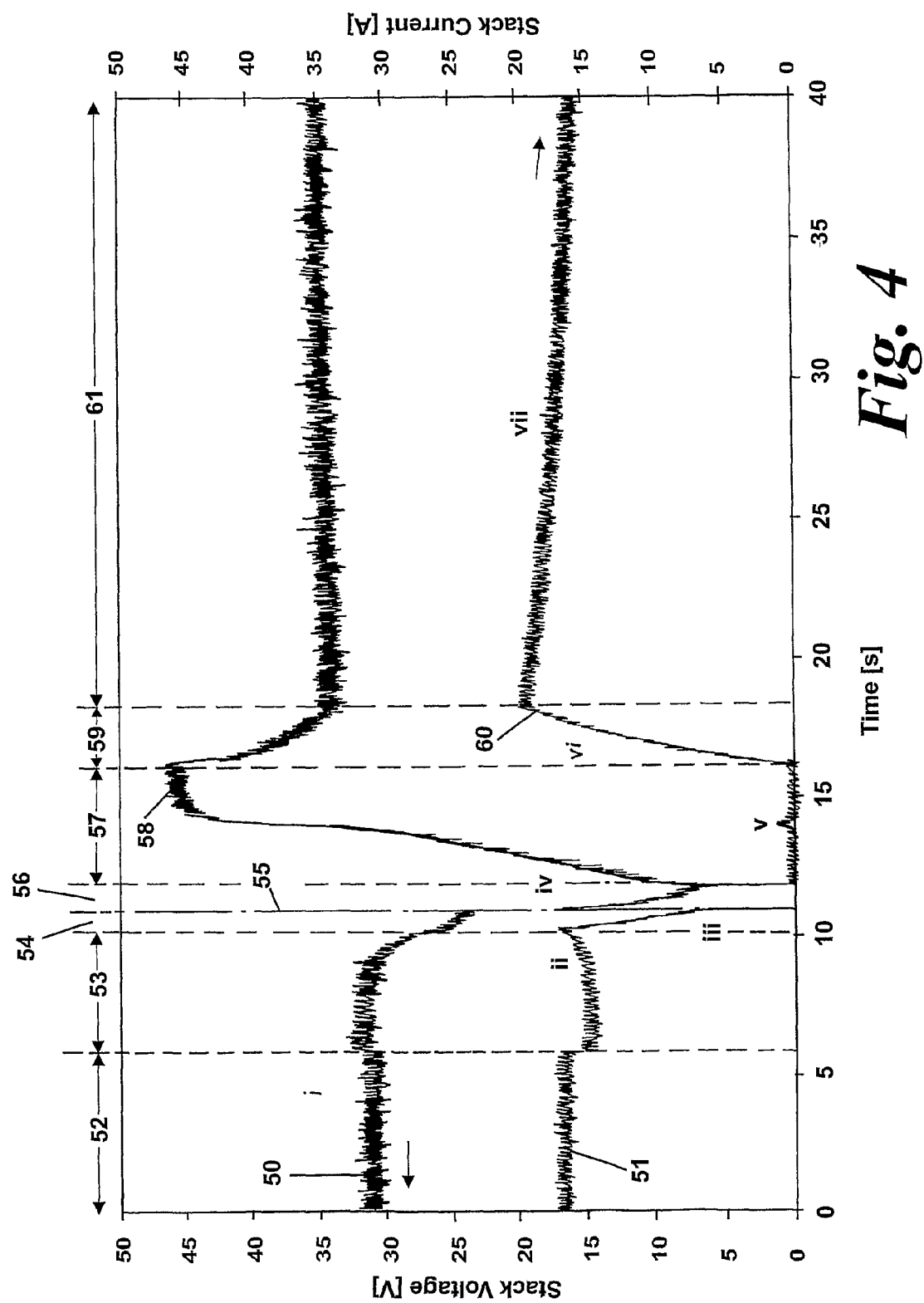
FIG. 4 is a graph showing stack voltage and stack current as a function of time before, during and after a stack hydration pulse.

Both air flow modulation and increased load may be used for the purposes of implementing rehydration intervals. The graph of FIG. 4 illustrates current and voltage profiles for this operation. The upper trace 50 represents stack voltage as a function of time, and the lower trace 51 represents stack current as a function of time.

During time period 52 (t=0-6 seconds), normal operation of the fuel cell is illustrated. During the next time period 53 (t=6-10 seconds), the cooling fans 34 providing the cathode air flow are turned off causing a rise in stack temperature. Towards the end of this time period, a small reduction in cell voltage is observed, with a corresponding small rise in current to maintain constant power, due to mass transport limitations. At the point where the voltage input to the DC/DC converter 40 approaches that of the terminal voltage of the battery 39, current from the fuel cell is reduced towards zero. Here, power delivery to the output terminals 35 will be supplemented by the battery 39.

The output from the fuel cell stack 31 is then isolated by opening relay 42 under minimum electronic load leaving the battery 39 to provide the continuous power supply to the application (e.g. external load 41), evidenced by the current falling to zero in time period 54 (t~10-11 seconds). At time t=11 seconds, the internal load resistor 36 is switched across the terminals 33 of the fuel cell stack 31, as evidenced by the spike 55. This electrically loads the fuel cell stack 31 further for a controlled period of time, namely a high current interval 56 (t~11-12 seconds).

During this high current interval 56, the remaining oxidant within the fluid flow channels of the fuel cell stack 31 is consumed and the stack terminal voltage is pulled down towards 0 V. Without the fans 34 drawing the water byproduct away, excess water remains at the MEA/gas diffusion layer interface of each cell 31. After the high current interval 56, the fuel cell stack 31 is isolated from all electrical load during isolation interval 57 (t=12-16 seconds). During this isolation interval, current flow is zero and the stack voltage 50 recovers to a peak at point 58 (t=16 seconds). During a reconnection time interval 59 (t~16-18 seconds), power from the stack 31 is brought back on line in a controlled manner using the digital control on the DC/DC converter 40 to gradually increase the current limit set point. At point 60, the fuel cell is fully on line and commences recharging the battery 39 (at t=18 seconds). The fuel cell recharges the battery as well as supplying power to the external load 41 during the following time period 61. The current gradually falls as the battery 39 approaches full state of charge.

After a suitable time interval, e.g. between 2 and 5 minutes, the next rehydration operation is initiated (not shown in FIG. 4). Any suitable time interval may be used that is effective to provide a useful average increase in cell voltage. Depending upon ambient conditions, such as temperature and humidity, and on whether the fuel cell is run under a constant fixed or variable load, the time interval might be as short as 1 minute or as long as 2 hours, for example.

The optimum frequency of the rehydration operations can depend on a number of factors, including atmospheric conditions such as temperature and humidity. When a multi-layer cathode gas diffusion layer is used, there can be a significantly larger increase in electrochemical performance and a longer period of time for the fuel cell performance to return to an equilibrated level compared to a single gas diffusion layer arrangements. This is also the case for using the technique with open cathode stacks as opposed to conventional pressurised cathodes where, in the latter case, the forced air flow channelling quickly removes the excess water.

Preferably, the rehydration operations are implemented automatically on a fixed periodic basis. However, it will be understood that a further control algorithm may be used to switch the fuel cell assembly 30 between a normal mode in which no rehydration operations take place, and a rehydration mode in which the periodic and temporary rehydration operations are performed. The periodicity of the rehydration operations may be controlled according to some measurable stack operating parameter, such as average temperature, humidity, voltage profile, current profile and power demand etc. The duty cycle of the rehydration intervals may be controlled according to some measurable stack operating parameter such as average temperature, humidity, voltage profile, current profile and power demand etc. Preferably, zero current is drawn during the isolation interval 57, but it will be understood that a low current might be drawn. In some embodiments, the isolation interval might not be required.

Other embodiments are intentionally within the scope of the accompanying claims.

The invention claimed is:

1. An electrochemical fuel cell assembly comprising:
   a fuel cell stack comprising a number of fuel cells each having a membrane-electrode assembly and fluid flow plates for delivery of fuel and oxidant thereto, and an electrical output for delivery of current from the fuel cell stack; and
   a stack power controller comprising a switchable load device, the stack power controller adapted to periodically and temporarily increase the current drawn from the fuel cell stack, in addition to or instead of independent current demand external to the electrochemical fuel cell assembly, by passing current from the fuel cell stack through the switchable load device during rehydration intervals to increase the hydration level of the fuel cells.

2. The assembly of claim 1 further comprising a reservoir power source coupled to external power output terminals of the electrochemical fuel cell assembly, in which the stack power controller is adapted to electrically isolate the electrical output of the fuel cell stack from the external power output terminals during the rehydration intervals.

3. The assembly of claim 1 further comprising a reservoir power source coupled to the external power output terminals of the electrochemical fuel cell assembly, and a load control device for controlling delivery of current to the external power output terminals from one or both of the reservoir power source and the fuel cell stack.

4. The assembly of claim 2 in which the reservoir power source is a rechargeable battery.

5. The assembly of claim 1 in which the stack power controller is adapted to implement the rehydration intervals at regular times.

6. The assembly of claim 1 in which the stack power controller is adapted to implement the rehydration intervals in response to a fuel cell stack parameter being within a predetermined threshold criteria.

7. The assembly of claim 3 in which the load control device is adapted to ramp up power delivery from the fuel cell stack to the external power output terminals in a controlled manner following the rehydration interval.

8. The assembly of claim 1 in which the stack power controller is adapted to modulate air flow through the fluid flow plates of the fuel cell stack during the rehydration interval.

9. An electrochemical fuel cell assembly comprising:
   a fuel cell stack comprising a number of fuel cells each having a membrane-electrode assembly and fluid flow plates for delivery of fuel and oxidant thereto, and an electrical output for delivery of current from the fuel cell stack; and
   a stack power controller for periodically and temporarily increasing the current drawn from the fuel cell stack, in addition to or instead of independent current demand external to the electrochemical fuel cell assembly, during rehydration intervals to increase the hydration level of the fuel cells,
   wherein the rehydration intervals each include a high current interval in which current drawn from the fuel cell stack is substantially higher than the normal operating current demand and an isolation interval in which the current drawn from the fuel cell stack is substantially lower than the normal operating current demand.

10. The assembly of claim 9 in which the stack power controller is adapted to electrically isolate the fuel cell stack during the isolation interval.

11. An electrochemical fuel cell assembly comprising:
a fuel cell stack comprising a number of fuel cells each having a membrane-electrode assembly and fluid flow plates for delivery of fuel and oxidant thereto, and an electrical output for delivery of current from the fuel cell stack;
a stack controller for modulating air flow through the fuel cell stack on a periodic basis independent of current demand on the fuel cell stack or the electrochemical fuel cell assembly to provide rehydration intervals that increase the hydration level of the fuel cells; and
means for maintaining the current demand to a load external to the electrochemical fuel cell assembly during the rehydration intervals.

12. A method of operating an electrochemical fuel cell assembly having a fuel cell stack comprising a number of fuel cells each having a membrane-electrode assembly and fluid flow plates for delivery of fuel and oxidant thereto, and an electrical output for delivery of current from the fuel cell stack, the method comprising the steps of:
periodically and temporarily increasing the current drawn from the fuel cell stack independent of current demand external to the electrochemical fuel cell assembly during rehydration intervals to increase the hydration level of the electrochemical fuel cells by passing current from the fuel cell stack through a switchable load device within the fuel cell assembly; and
maintaining the current demand to a load external to the electrochemical fuel cell assembly during the rehydration intervals.

13. The method of claim 12 in which the step of maintaining the current demand during rehydration intervals comprises using a reservoir power source.

14. A method of operating an electrochemical fuel cell assembly having a fuel cell stack comprising a number of fuel cells each having a membrane-electrode assembly and fluid flow plates for delivery of fuel and oxidant thereto, and an electrical output for delivery of current from the fuel cell stack, the method comprising the steps of:
modulating air flow through the fuel cell stack on a periodic basis independent of current demand on the fuel cell stack or the electrochemical fuel cell assembly to provide rehydration intervals that increase the hydration level of the fuel cells while maintaining the current demand to a load external to the electrochemical fuel cell assembly during the rehydration intervals.

* * * * *